(12) United States Patent
Iverson et al.

(10) Patent No.: US 6,828,755 B1
(45) Date of Patent: Dec. 7, 2004

(54) BATTERY SYSTEM MODULE

(75) Inventors: Michael E. Iverson, Menomonee Falls, WI (US); Thomas J. Dougherty, Waukesha, WI (US); Chih Y. Chen, Oak Creek, WI (US); Scott G. Klos, Grafton, WI (US); Thomas J. Green, West Bend, WI (US); Mark M. Gondek, Milwaukee, WI (US)

(73) Assignee: Johnson Controls Technology Company, Plymouth, MI (US)

( * ) Notice: Subject to any disclaimer, the term of this patent is extended or adjusted under 35 U.S.C. 154(b) by 0 days.

(21) Appl. No.: 10/271,355

(22) Filed: Oct. 15, 2002

Related U.S. Application Data

(60) Provisional application No. 60/329,400, filed on Oct. 15, 2001.

(51) Int. Cl.[7] .................................................. H02J 7/00
(52) U.S. Cl. ..................................................... 320/104
(58) Field of Search ........................ 320/104; 429/100, 429/96–99, 121, 123, 178, 179; 307/43, 64, 66

(56) References Cited

U.S. PATENT DOCUMENTS

| | | | |
|---|---|---|---|
| 2,104,769 A | 1/1938 | Saunders | 180/68.2 |
| 2,717,045 A | 9/1955 | Nallinger | 180/68.2 |
| 3,977,490 A | 8/1976 | Flaig | 165/47 |
| 4,006,280 A | 2/1977 | Walker et al. | 429/98 |
| 4,738,906 A | 4/1988 | Sanders | 429/120 |
| 4,816,736 A * | 3/1989 | Dougherty et al. | 320/116 |
| 4,976,327 A | 12/1990 | Abujudom, II et al. | 180/68.2 |
| 5,002,840 A * | 3/1991 | Klebenow et al. | 429/9 |
| 5,031,712 A | 7/1991 | Karolek et al. | 180/68.2 |
| 5,082,075 A | 1/1992 | Karolek et al. | 180/68.2 |
| 5,215,834 A | 6/1993 | Reher et al. | 429/62 |
| 5,320,190 A | 6/1994 | Naumann et al. | 180/68.2 |
| 5,432,026 A | 7/1995 | Sahm et al. | 429/120 |
| 5,536,595 A | 7/1996 | Inkmann et al. | 429/120 |
| 5,542,489 A | 8/1996 | Allison et al. | 180/68.5 |
| 5,543,248 A | 8/1996 | Dougherty et al. | 429/163 |
| 5,549,984 A * | 8/1996 | Dougherty | 429/61 |
| 5,552,642 A * | 9/1996 | Dougherty et al. | 307/10.3 |
| 5,636,701 A | 6/1997 | Norman et al. | 180/68.5 |
| 5,681,668 A | 10/1997 | Reed et al. | 429/100 |
| 6,152,096 A | 11/2000 | Setsuda | 123/184.1 |
| 6,230,677 B1 | 5/2001 | Setsuda | 123/184.1 |
| 6,230,833 B1 | 5/2001 | Setsuda | 180/685 |
| 6,255,014 B1 * | 7/2001 | Dougherty et al. | 429/82 |
| 6,340,538 B1 | 1/2002 | King | 429/96 |
| 6,452,361 B2 * | 9/2002 | Dougherty et al. | 320/104 |
| 6,461,758 B1 * | 10/2002 | Geibl et al. | 429/72 |
| 2002/0196646 A1 * | 12/2002 | Cook et al. | 363/141 |
| 2003/0047366 A1 | 3/2003 | Andrew et al. | 180/68.5 |

* cited by examiner

*Primary Examiner*—Pia Tibbits
(74) *Attorney, Agent, or Firm*—Foley & Lardner LLP

(57) ABSTRACT

A module for a battery is disclosed. The module includes a power system in the container. The power system also includes a high voltage battery for powering high voltage loads. The power system also includes a low voltage battery for powering low voltage loads. The module also includes a converter at least partially in the container configured for directing power provided from the high voltage battery to the low voltage battery. The module also includes a device for disconnecting at least one of the high voltage battery from the high voltage loads and the low voltage battery from the low voltage loads. The container is configured to transfer heat from the battery system to an outside of the container. A module for thermal management of a battery system is also disclosed. An energy management system for a battery system is also disclosed.

43 Claims, 6 Drawing Sheets

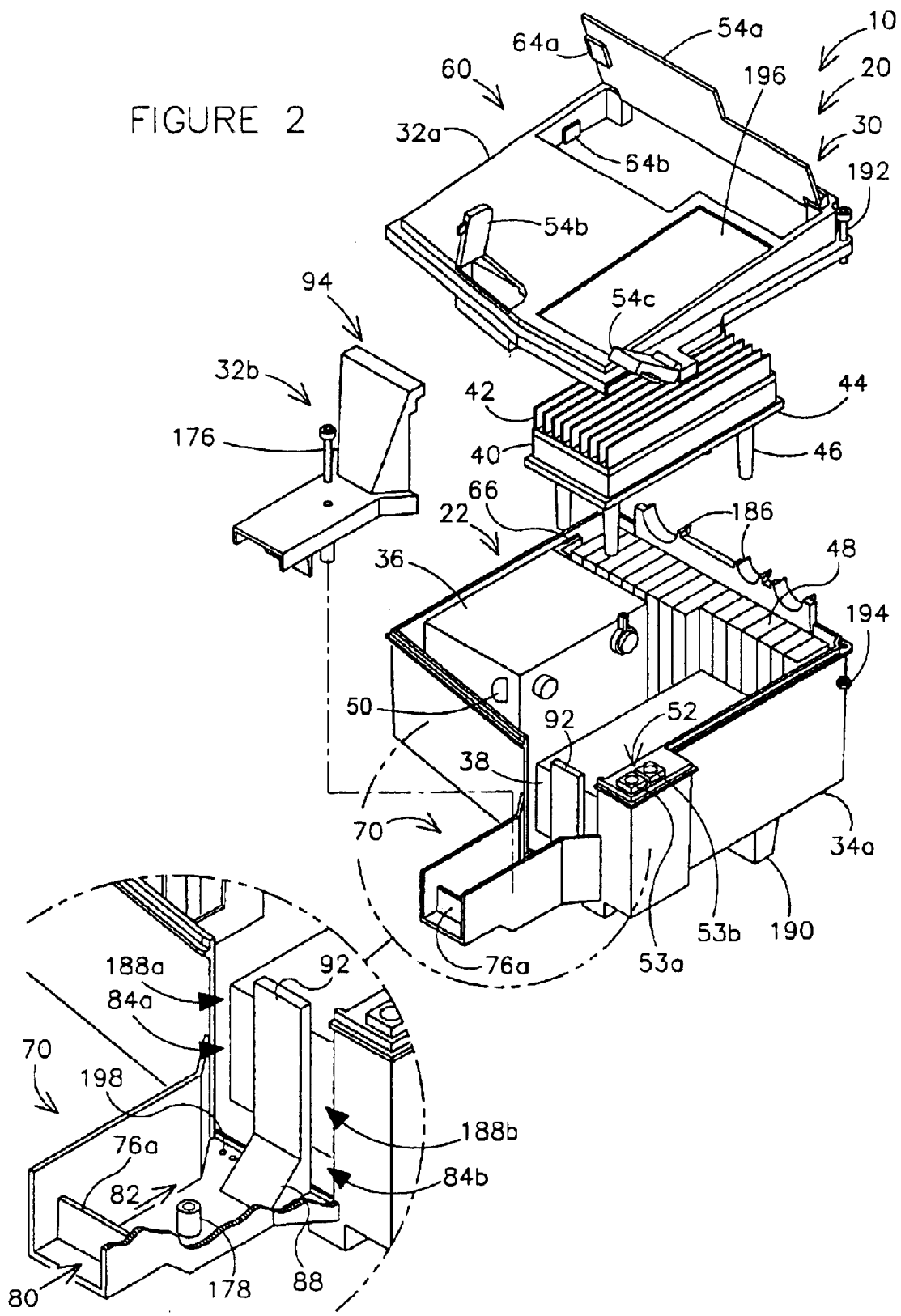

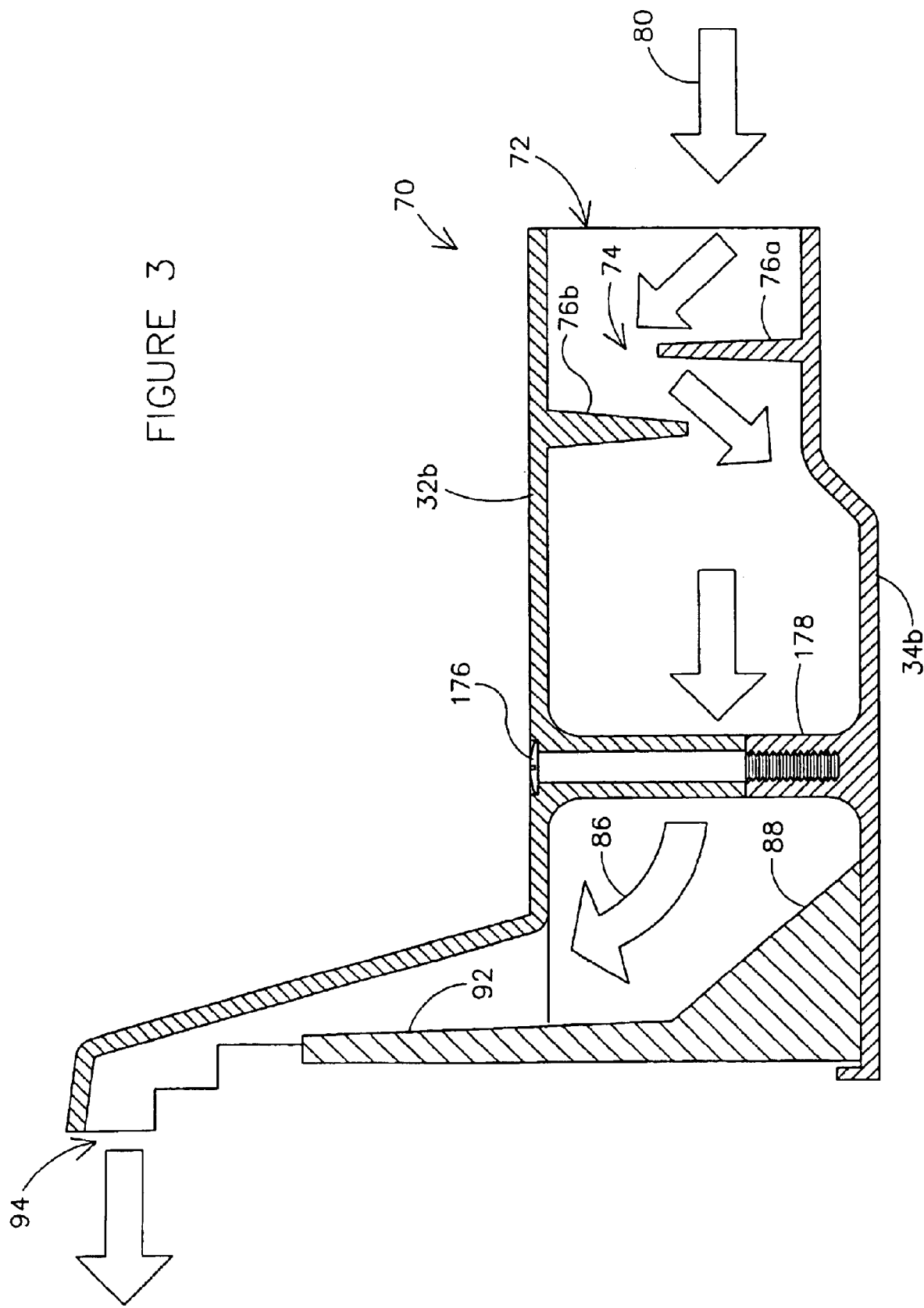

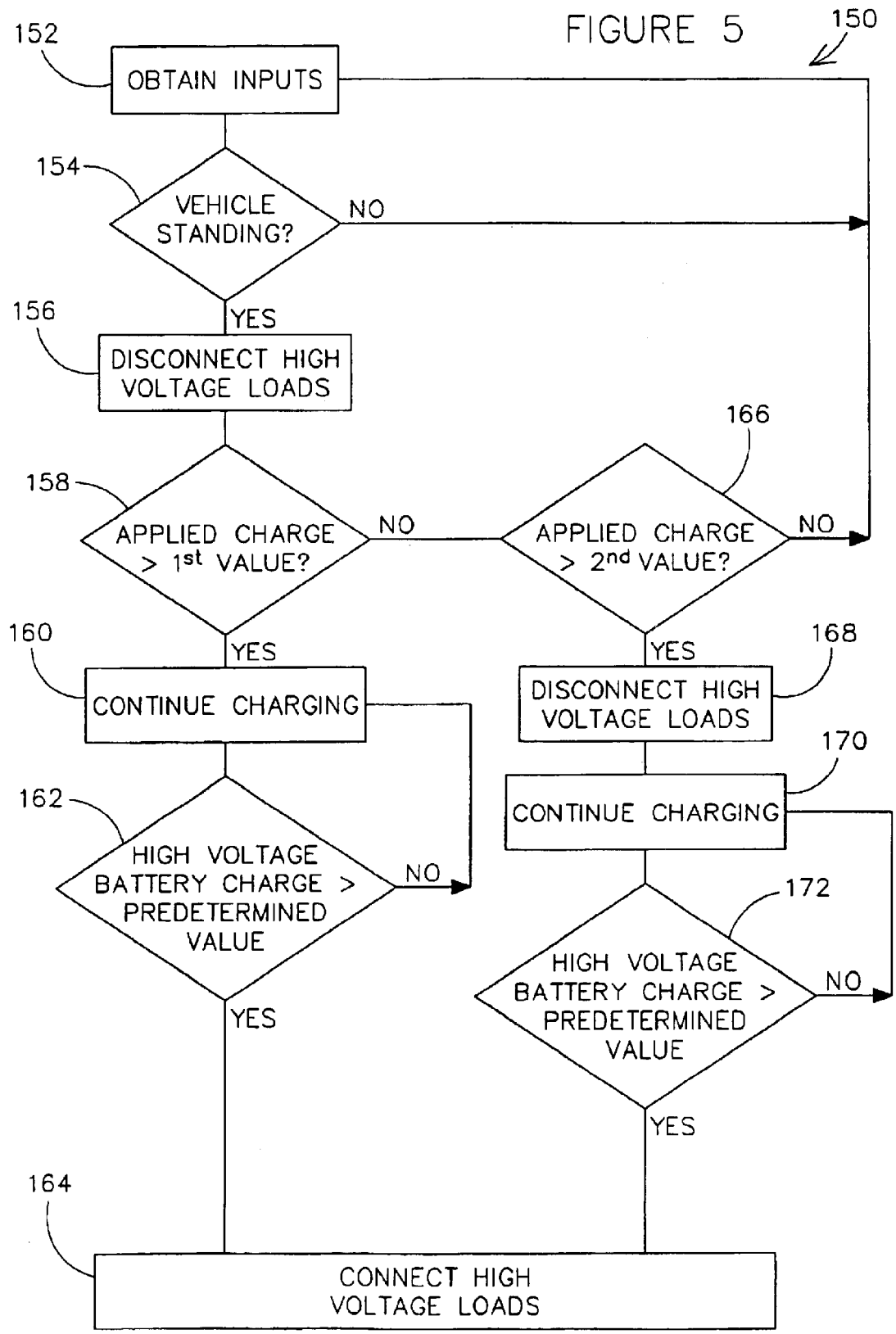

BATTERY SYSTEM MODULE

CROSS-REFERENCE TO RELATED PATENT APPLICATIONS

The following U.S. patent applications are hereby cross-referenced and incorporated by reference: U.S. Provisional Patent Application No. 60/329,400 titled "Energy and Thermal Management System For A Vehicle" filed Oct. 15, 2001.

FIELD

The present invention relates to a battery system module. The present invention more specifically relates to a module for managing the transfer of heat from a battery and for controlling the use of the battery in the electrical system of a vehicle.

BACKGROUND

An electric storage battery is typically installed in the engine compartment of an automobile, along with a variety of other components (e.g. engine, radiator, etc.). The battery may be adversely affected by the transfer of heat from such components. It is generally known to provide a shroud around the battery to minimize the effects of such heat transfer. However, such known shroud has several disadvantages including that it does not restrict debris (e.g. salt, dirt, water, etc.) from interacting with the battery. Further, such known shroud may result in inefficient positioning of the components within the engine compartment.

It is also generally known to provide for a system for disconnecting a battery from a load of an electrical system of the vehicle. According to such known system, a controller manipulates a switching mechanism between a closed position and an opened position. In the closed position the switching mechanism connects the load to the battery, and in the opened position the switching mechanism disconnects the load from the battery. However, such known system has several disadvantages including that certain loads may remain connected to the battery when the battery is being charged. Further, such known system is not readily adaptable for providing power from the battery to loads of multiple voltages.

Accordingly, it would be advantageous to provide a module for managing the transfer of heat from a battery and for controlling the use of the battery in the electrical system of a vehicle. It would also be advantageous to provide a thermal management system for a battery that is configured to inhibit debris from interacting with the battery. It would also be advantageous to provide a module that is capable of interfacing with an auxiliary power source for charging the battery. It would be desirable to provide for a battery system module having one or more of these or other advantageous features.

SUMMARY OF THE INVENTION

The present invention relates to a module for a battery. The module includes a container having a cover coupled to a base. The module also includes a battery system in the container. The battery system includes a high voltage battery for powering a plurality of high voltage loads. The battery system also includes a low voltage battery for powering a plurality of low voltage loads. The module also includes a converter at least partially in the container configured for directing power provided from the high voltage battery to the low voltage battery. The module also includes a device for disconnecting at least one of the high voltage battery from the plurality of high voltage loads and the plurality of low voltage battery from the low voltage loads. The container is configured to transfer heat from the battery system to an outside of the container.

The present invention also relates to a module for thermal management of a battery system. The module includes a compartment having a cover and a base for containing a first battery and a second battery. The module also includes an inlet for the intake of air into the compartment. The inlet includes a first air flow path for the transfer of heat from the first battery. The inlet also includes a second air flow path for the transfer of heat from the second battery. The module also includes a baffle. The inlet is configured to provide air into the container when the vehicle is moving and the baffle is configured to inhibit debris from entering the container when the vehicle is moving.

The present invention also relates to an energy management system for a battery system having a high voltage battery for high voltage loads and a low voltage battery for low voltage loads of a vehicle having an engine. The system includes a first switch configured to disconnect the high voltage battery from the high voltage loads. The system also includes a second switch configured to disconnect the low voltage battery from the low voltage loads. The system also includes a control system configured to open the first switch when the engine is off. The control system is further configured to close the first switch when the charge of the high voltage battery is greater than a predetermined value. The control system is further configured to open the second switch when a voltage applied to at least one of the high voltage battery and the low voltage battery less than a predetermined value.

DESCRIPTION OF THE FIGURES

FIG. 2 is an exploded perspective view of a thermal management system of the module of FIG. 1.

FIG. 3 is a sectional view of an inlet of the thermal management system of FIG. 2.

FIG. 5 is a flow diagram of a routine for jumping a vehicle according to an exemplary embodiment.

DETAILED DESCRIPTION OF PREFERRED AND OTHER EXEMPLARY EMBODIMENTS

Figure 1:
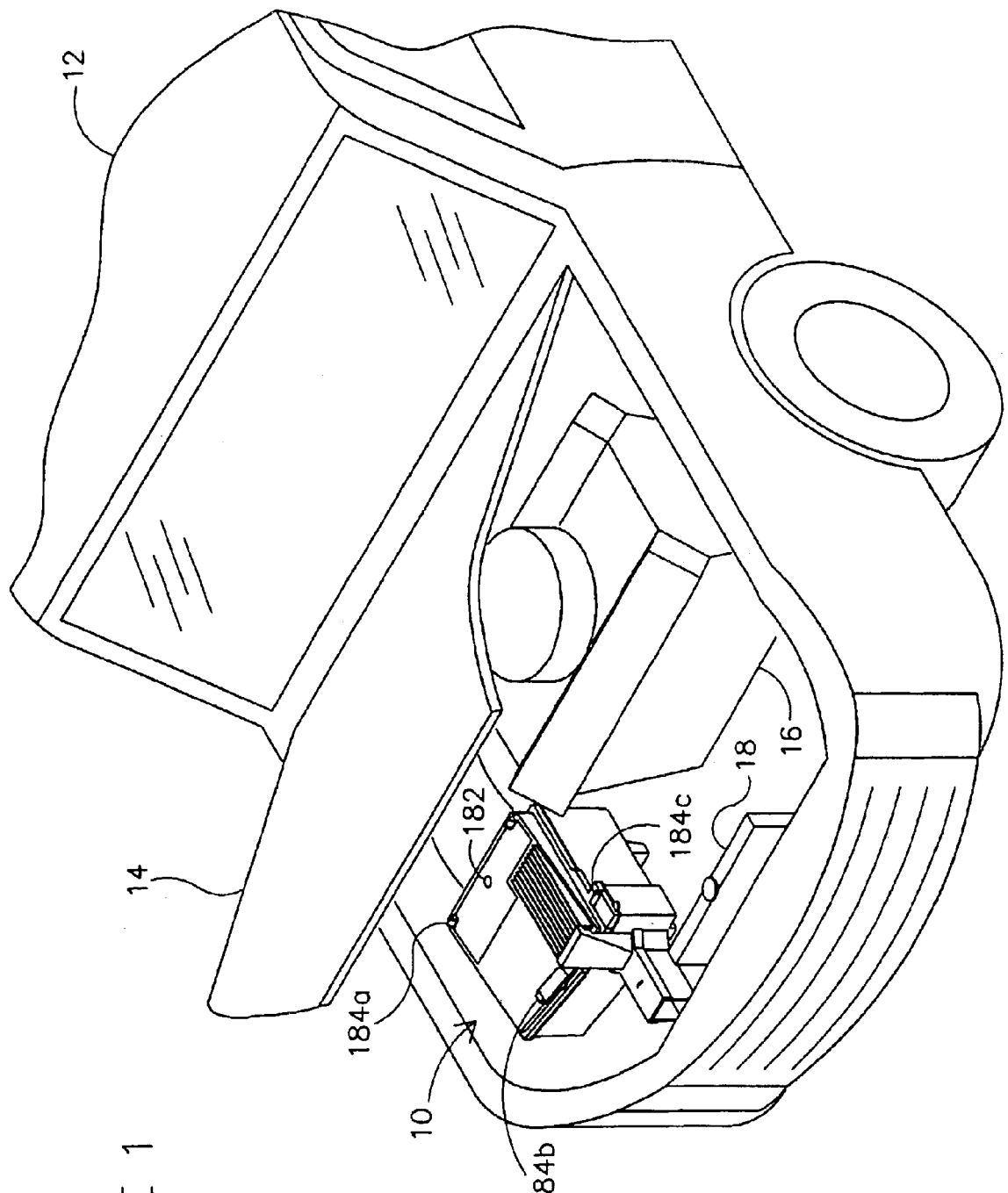
FIG. 1 is a perspective view of a battery system module installed in a vehicle according to an exemplary embodiment.

Referring to FIG. 1, a battery system module 10 is shown according to an exemplary embodiment. Battery system module 10 is shown installed in a vehicle 12 under a hood 14, along with other components (shown as an engine 16 and a radiator 18). Battery system module 10 includes a thermal management system 20 for the transfer of heat from a power system 22 (see FIG. 2). Battery system module 10 also includes an energy management system 100 for controlling the use of power system 22 for an electrical system 110 of vehicle 12 (see FIG. 4A).

Referring to FIG. 2, thermal management system 20 is shown according to an exemplary embodiment. Thermal management system 20 includes a container 30 having a cover 32a removable attached to a base 34a by a fastener (shown as a bolt 192 and a nut 194). Power system 22 is installed in base 34a. Power system 22 includes a low voltage battery 36 for low voltage loads 136 of electrical system 110 and a high voltage battery 38 for high voltage loads 138 of electrical system 110.

Power system 22 also includes a converter 40 for directing power from low voltage battery 36 (or an auxiliary power source 114 such as a battery or an alternator/integrated starter generator) to high voltage battery 38, and from high voltage battery 38 (or auxiliary power source 114) to low voltage battery 36. The converter is a bi-directional, 1.5 kW continuous DC to DC converter commercially available from Johnson Controls of Cergy-Pontoise Cedex, France according to a particularly preferred embodiment.

Converter 40 is supported by a platform 44 elevated by legs 46 over high voltage battery 38. Platform 44 serves multiple functions. Platform 44 provides a space between high voltage battery 38 and converter 40 for the flow of cooling air from an inlet 70 of container 30. Platform 44 and also serves as a heat shield and as a barrier to potential gassing between high voltage battery 38 and converter 40. Platform 44 also serves as a "holddown" or fastener for maintaining the position of high voltage battery 38 and to inhibit potential movement of high voltage battery 38 caused by vibration of vehicle 12.

Heat exchange fins 42 of converter 40 extend through an aperture 196 of cover 32a to provide additional transfer of heat from converter 40. A fuse block 48 for connecting low voltage battery 36 to low voltage loads 136 and high voltage battery 38 to high voltage loads 138 is also located in base 34a Utilities (such as electrical cables) may be provided from fuse block 48 to the loads of electrical system 110 through passages 186 as shown in FIG. 2.

A lid or door of cover 32a provides access to power system 22 (e.g. for service). A door 54a connected to cover 32a by a hinge 184a provides access to fuse block 48. A door 54b connected to cover 32a by a hinge 184b provides access to a mounting interface (shown as a jump aid terminal or post 50) for charging of low voltage battery 36 with auxiliary power source 114 (shown as a low voltage auxiliary power source 116 in FIG. 4B). A door 54c connected to cover 32a by a hinge 184c provides access to a mounting interface (shown as a jump start terminal or post 52 having a positive terminal 53a and a negative terminal 53b) for charging of high voltage battery 38 with auxiliary power source 114 (shown as a high voltage auxiliary power source 118 in FIG. 4B).

The jump start post is "keyed" or indexed so that it may only be connected to a high voltage battery (e.g. 36 volt battery) of proper polarity according to a preferred embodiment. The jump start post is recessed in a housing according to a preferred embodiment. The jump aid post and the jump start post may be a single interface for mounting to the auxiliary power source and for charging of either the high voltage battery or the low voltage battery according to an alternative embodiment.

Figure 4A:
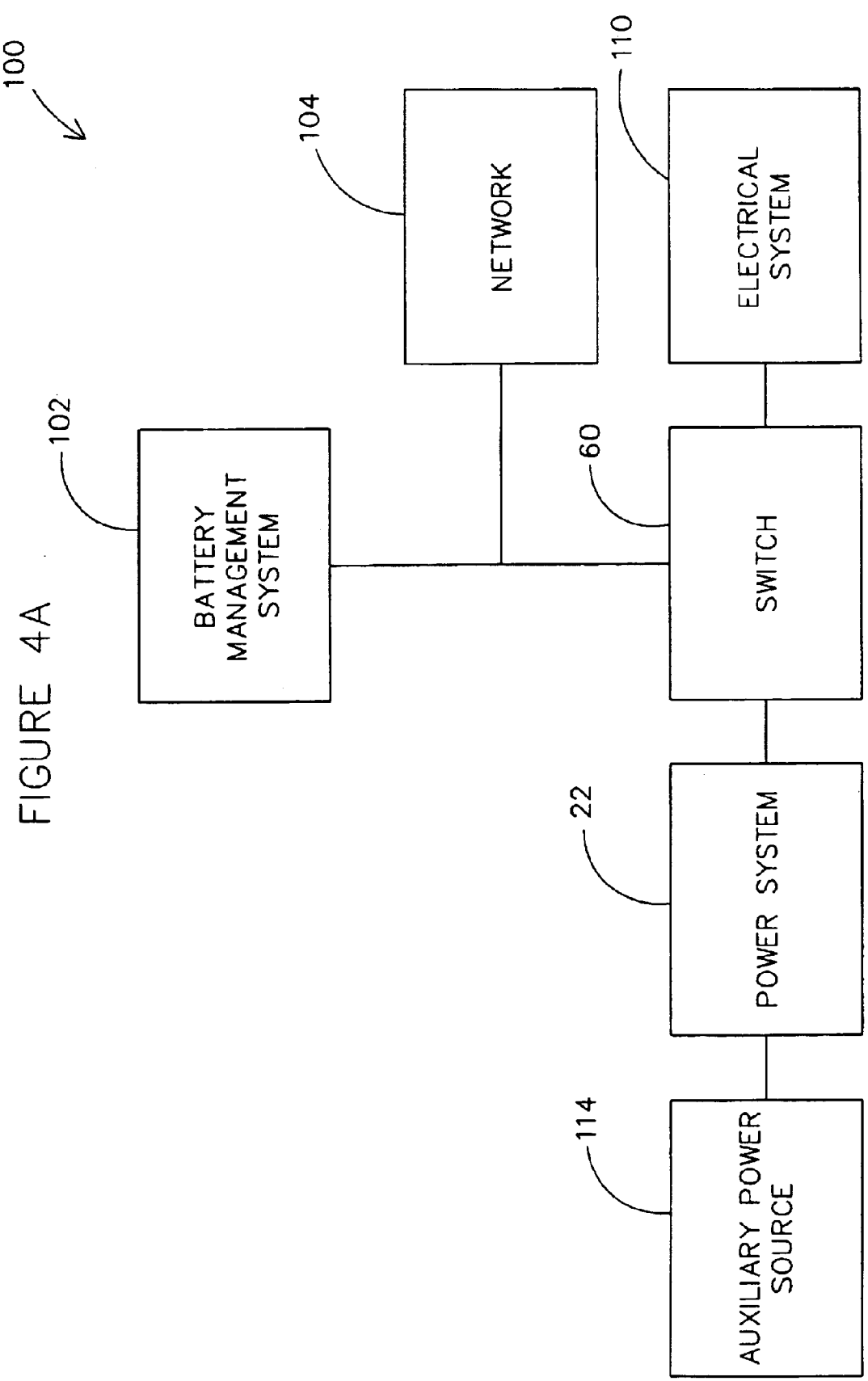
FIG. 4A is a schematic block diagram of an energy management system of the module of FIG. 1 according to an exemplary embodiment.

A device or interlock switch 60 is opened to disconnect high voltage loads 138 from high voltage battery 38 according to a preferred embodiment as shown in FIGS. 2 and 4A. Disconnection of high voltage loads 138 from high voltage battery 38 may assist in inhibiting "arcing" of current during fuse change, battery change, or jump starting. Switch 60 includes an actuator 64a attached to door 54a as shown in FIG. 2. (Switch 60 may include an actuator 64b attached to cover 32a according to an alternative embodiment as shown in FIG. 2.) Switch 60 is opened when actuator 64a (or actuator 64b according to an alternative embodiment) is disengaged from or are placed a predetermined distance from a sensor 66 in base 34a. For example, switch 60 is opened when door 54a is opened or cover 32a is removed from base 34a (and all high voltage loads 138 are disconnected from high voltage battery 38). The switch may be opened on the occurrence of a predetermined condition (e.g. crash event, excess vibration, rapid deceleration, discharge of airbags, low state of charge of battery system, manual activation, etc.) according to an alternative embodiment.

Referring to FIGS. 2 and 3, air is "rammed" or forced into an intake 72 of inlet 70 along an initial air flow path 80 when vehicle 12 is moving in a forward direction. (Air may be provided from an auxiliary source such as a fan, a vent from an air conditioning unit, etc. according to an alternative embodiment.) Inlet 70 includes a cowling or cover 32b attached to a base 34b by a fastener (shown as a bolt 176 and a nut 178). The fastener assists in providing a turbulent air flow through inlet 70, which is believed to increase dispersion and mixing of air in container 30 and to increase the transfer of heat from power system 22.

A baffle 74 of inlet 70 has a lower vertical partition or wall 76a extending from base 34b and an upper vertical partition or wall 76b extending from cover 32b. Baffle 74 provides a tortuous or winding path for air following initial air flow path 80. Baffle 74 permits the flow of air through inlet 70, and inhibits the flow of debris through inlet 70 (i.e. the debris is substantially blocked by wall 76a and/or wall 76b). An aperture (shown as a drain 198) provides for the discharge of the debris that may enter inlet 70.

The air flow in container 30 is disrupted or deflected by power system 22, which assists in dispersion and mixing of the air in container 30 and increases heat transfer from the components of power system 22. After passing baffle 74, air follows a horizontal air flow path 82 for transfer of heat from low voltage battery 36 and from high voltage battery 38, or a vertical air flow path 86 for transfer of heat from converter 40. Horizontal air flow path 82 is in-line with inlet 70. Horizontal air flow path 82 includes a branch 84a that diverges around one side of a ramp 88 through a major opening 188a between low voltage battery 36 and high voltage battery 38 (see FIG. 2). Horizontal air flow path 82 has a branch 84b that diverges around another side of ramp 88 through a minor opening 188b between base 34a and high voltage battery 38 (see FIG. 2). (Major opening 188a has a greater cross sectional area than the minor opening 188b according to a preferred embodiment as shown in FIG. 2.) Air from inlet 70 exits container 30 through an aperture of a fastener or holddown 190.

Vertical air flow path 86 follows an incline of ramp 88. From ramp 88, vertical air flow path 86 follows a vertical wall 92 along a chimney or vent 94 of cover 32b. Air is exhausted through vent 94 and blown over cover 32a to cool fins 42 of converter 40. According to a preferred embodiment, less than about 50 percent of the air provided through the air intake follows the vertical air flow path.

Referring to FIG. 4A, a schematic block diagram of energy management system 100 is shown according to an exemplary embodiment. Energy management system 100 includes power system 22 for the loads of electrical system 110. A battery management system 102 of energy management system 100 provides outputs or commands to open and close switch 60 to connect and disconnect electrical system 110 with power system 22. Power system 22 is configured for charging by connection of auxiliary power source 114 to jump aid post 50 or jump start post 52 (see FIG. 2). Battery management system 102 is in communication with a network 104 according to a preferred embodiment as shown in FIG. 4A.

Figure 4B:
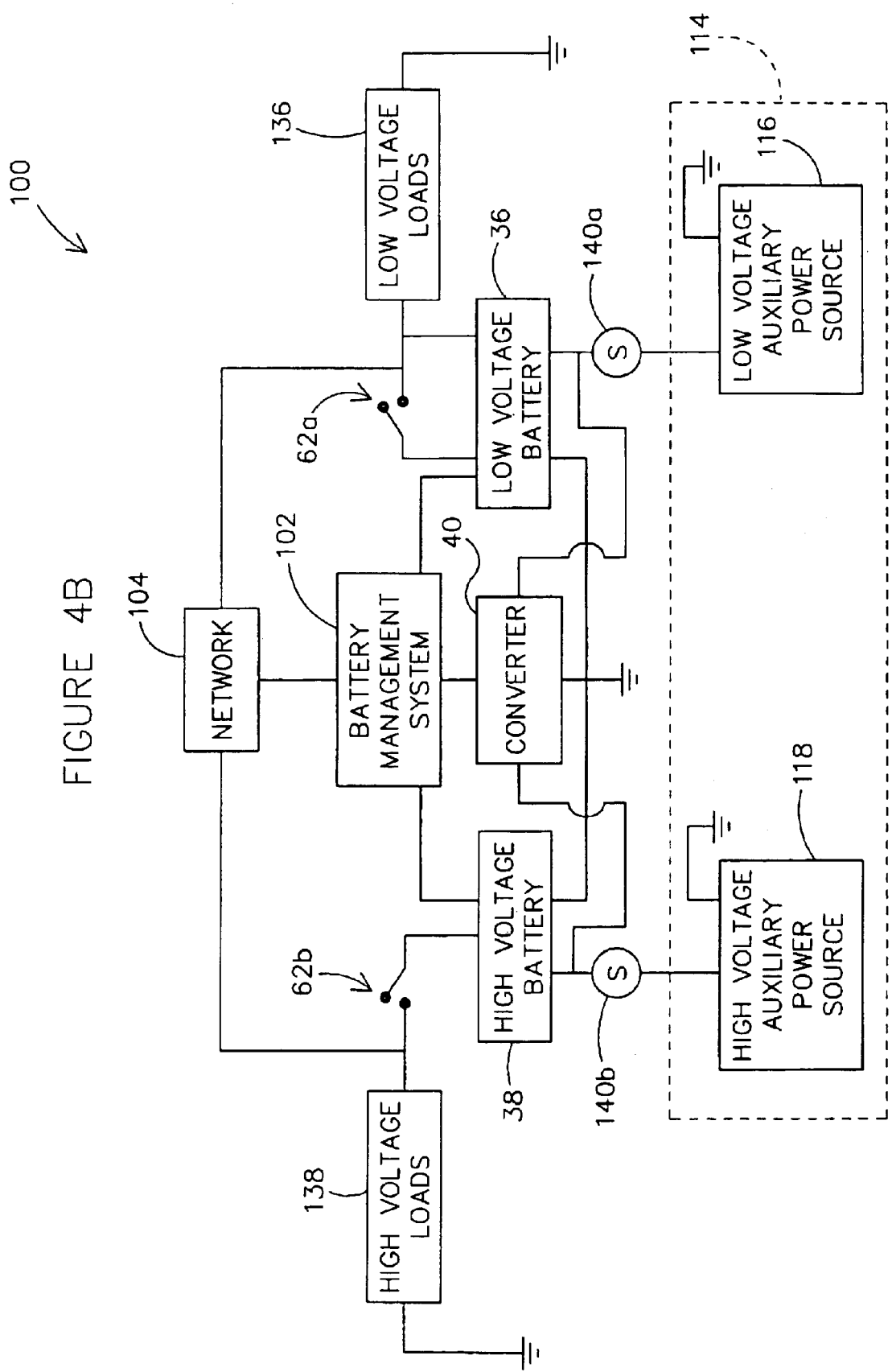
FIG. 4B is a schematic block diagram of the energy management system of the module of FIG. 1 according to an alternative embodiment.

Referring to FIG. 4B, a schematic block diagram of management system 100 is shown according to an exemplary embodiment. Low voltage battery 36 is connected to low voltage loads 136 by power switch 62*a*, and high voltage battery 38 is connected to high voltage loads 138 by power switch 62*b*. Auxiliary power source 114 is connected to jump aid post 50 or jump start post 52 to charge power system 22. As shown in FIG. 4B, a low voltage auxiliary power source 116 (such as a 12 volt battery) is connected to jump aid post 50 to charge high voltage battery 38 (through converter 40) and/or power high voltage loads 138. High voltage auxiliary power source 118 (such as a 36 volt battery) is connected to jump start post 52 to charge high voltage battery 38 and/or power high voltage loads 138.

Signals or inputs representative of a condition or state of power system 22, electrical system 110 and/or auxiliary power source 114 are provided to battery management system 102. The inputs are representative of a condition of auxiliary power source 114 according to a preferred embodiment. The inputs are provided by a voltage sensor 140*a* associated with low voltage auxiliary power source 116 or a voltage sensor 140*b* associated with high voltage auxiliary power source 118 (see FIG. 4B). The inputs may also be provided by network 104 in communication with other devices such as a vehicle controller or controller area network (CAN) controller. (The network includes a CAN network or CAN bus according to a preferred embodiment, and may include other suitable networks for providing information about the loads such as a J1850 VPW network, ISO9141/Keyword 2000 network, etc. according to alternative embodiments.) The inputs may also be provided by a user interface or otherwise acquired according to any preferred or alternative embodiments.

Based on the inputs, battery management system 102 provides outputs intended to direct or control the use of power system 22 (e.g. battery "management"). One output provided by battery management system 102 includes a command to open and close switches 62*a* and/or 62*b* to disconnect low voltage battery 36 from low voltage loads 136 and to disconnect high voltage battery 38 from high voltage loads 138 (respectively). Another output includes a command by battery management system 102 to charge low voltage battery 36 or high voltage battery 38 with auxiliary power source 114 and/or converter 40. Another output includes providing information (e.g. charging of the batteries is in progress, the batteries are sufficiently charged to permit a jump start of the vehicle, etc.) to a display such as an indicator (shown as a light 182 in FIG. 1).

Another output of battery management system 102 includes a command to provide redundant or backup power for "essential" loads (e.g. high voltage electric starting, steering, braking, etc.). For example, when vehicle 12 is "standing," battery management system 102 monitors the voltage of high voltage battery 38 and enables low voltage battery 36 to charge high voltage battery 38 through converter 40. Such charging maintains high voltage battery 38 at greater than about 80 percent state of charge to increase the likelihood of starting vehicle 12 at all times according to a preferred embodiment. The charging of high voltage battery 38 continues as long as vehicle 12 is standing and low voltage battery 36 maintains a charge greater than a predetermined value (e.g. about 12.2 volts). (The battery management system may also provide a signal to permit the low voltage battery to support any loads that are turned on when the vehicle is standing by enabling the converter in a "buck" mode to power certain of the low voltage loads (e.g. lights) according to an alternative embodiment.)

Battery management system 102 follows a routine 150 to determine whether to open and close switches 62*a* and 62*b* (see FIG. 5). According to routine 150, battery management system 102 provides a command to open switch 62*b* to disconnect high voltage battery 38 from high voltage loads 138 when vehicle 12 is standing. Inputs representative of whether vehicle 12 is standing are provided to battery management system 102 (step 152). Battery management system 102 makes a determination whether vehicle 12 is standing, "off," or not in use according to inputs provided from network 104 (e.g. engine on, loads on, "noise" or signals on the network or CAN bus, etc.) or on the occurrence of certain events (e.g. key fob, opening a door, turning on lights, etc.), etc. (step 154) according to a preferred embodiment.

If battery management system 102 determines that vehicle 12 is not likely standing, then battery management system 102 continues to obtain inputs (step 152). If battery management system 102 determines that vehicle 12 is likely standing, then battery management system 102 provides a command to open switch 62*b* to disconnect high voltage battery 38 from high voltage loads 138 (step 156), thereby reducing current drain until high voltage battery 38 is sufficiently charged. (The starter is disconnected from the high voltage battery so an attempt to start the vehicle is not made when the high voltage battery does not have sufficient charge—and to ensure that vehicle start currents are not potentially pulled through the converter according to an alternative embodiment.)

Battery management system 102 makes a determination whether auxiliary power source 114 is connected to power system 22 in an attempt to jump vehicle 12 (e.g. by receiving a signal from sensor 140*a* or sensor 140*b*, identifying a voltage increase of power system 22, etc.). If the voltage applied to power system 22 is greater than a first predetermined value (e.g. greater than about 30 volts, greater than about 41 volts, etc), then battery management system 102 makes a determination that high voltage auxiliary power source 118 is connected to power system 22 (step 158). Battery management system 102 then permits charging of high voltage battery 38 with high voltage auxiliary power source 118 (step 160) (or direct powering of high voltage loads 138 according to an alternative embodiment).

Battery management system 102 makes a determination whether the charge of high voltage battery 38 is greater than a predetermined value (step 162). Charging of high voltage battery 38 continues until the predetermined value is reached (step 160). If the charge of high voltage battery 38 is greater than the predetermined value, then high voltage loads 138 are reconnected (step 164) and vehicle 12 is started. The predetermined value is a charge readily available and sufficient to start the vehicle according to a preferred embodiment, and 80 percent "state of charge" (i.e. the amount of electrical energy stored in a battery at a given time expressed as a percentage of the energy when fully charged) according to an alternative embodiment.

If the voltage applied to power system 22 by auxiliary power source 114 is greater than a second predetermined value (e.g. greater than about 12.6 volts, greater (or less) than about 13.4 volts, less than about 18 volts, etc.), then battery management system 102 makes a determination that low voltage auxiliary power source 116 is connected to power system 22 (step 166). (Battery management system 102 may disconnect low voltage loads 136 from low voltage battery 36 according to an alternative embodiment.) Battery management system 102 then permits charging of high voltage battery 38 with low voltage auxiliary power source 116 through converter 40 (step 170). Battery management system 102 then makes a determination whether the charge of high voltage battery 38 is greater than a predetermined value (e.g. a readily available charge that is sufficient to start a vehicle, 80 percent state of charge, etc.) (step 172). Charging continues until the predetermined value is reached (step 170). If the charge of high voltage battery 38 is greater than the predetermined value, high voltage loads 138 are reconnected (step 164) (and low voltage loads 136 are reconnected according to an alterntative embodiment) and vehicle 12 is started.

The battery system includes a lead-acid battery for an automobile according to a preferred embodiment. A suitable low voltage battery includes a 12 volt or 14 volt absorptive glass mat (AGM) valve regulated lead-acid (VLRA) battery such as a 12 volt Red Top Optima battery commercially available from Optima Batteries, Inc. of Boulder, Colo. Another suitable low voltage battery includes the 12 volt or 14 volt "non-flooded" DieHard battery commercially available from Sears, Roebuck and Co. of Hoffman Estates, Ill. A suitable high voltage battery includes the 36 volt or 42 volt 2.4 amp hour (AH) Inspira battery commercially available from Johnson Controls Battery Group, Inc. of Milwaukee, Wis. The battery system may include three 12 volt batteries connected in series to form a 36 volt battery pack according to an alternative embodiment.

The integrated switch may be a single switch used to detect removal of the cover from the base of the container and to signal multiple or single power switches to disconnect all loads from the power system according to an alternative embodiment. The integrated switch is a magnetic proximity sensor switch having a sensor model no. PRX-8800 and an actuator model no. PRX+8100 each commercially available from Allied Electronics, Inc. of Milwaukee, Wis. according to a particularly preferred embodiment.

The power switches may be mechanical switches or relays that respond to a current or voltage change to connect and disconnect the loads from the power system according to an alternative embodiment. The power switches may include multiple switches to disconnect certain loads (e.g. high voltage loads, low voltage loads, nonessential loads such as lighting systems) according to another alternative embodiment. The power switches may be "solid state" switches comprising primarily semi-conducting materials and components, such as a metal oxide semiconductor field effect transistor ("MOSFET") according to any alternative or preferred embodiment. The power switches may include a manually activated main or system switch to disconnect all loads of the electrical system from the battery system according to another alternative embodiment.

The high voltage loads may include a vehicle starter, ignition, fuel systems (e.g. fuel pump, fuel motors, fuel actuators, etc.) alternator, generator, electric steering system, electric braking system, active suspension, heater, fans, electric radiator cooling fan, etc. according to any preferred or alternative embodiment. The high voltage loads include a power train, including an integrated starter generator (ISG), 42 volt alternator according to an alternative embodiment. The high voltage loads include a starter and starter solenoid such as a 42 volt 1.4 kW starter and starter solenoid commercially available from Visteon Corporation. The low voltage loads may include a lighting system (e.g. headlights, indicator lights, etc.), blower, fan, heating and cooling system, air conditioning system, accessory (e.g. radio, windshield washing system, adapter outlet, cigarette lighter, etc.), etc. according to any preferred or alternative embodiment.

The battery management system may be a computing device, microprocessor, controller or programmable logic controller ("PLC") for implementing a control program, and which provides output signals based on input signals provided by a sensor or that are otherwise acquired or obtained. Any suitable computing device of any type may be included in the battery management system according to alternative embodiments. For example, computing devices of a type that may include a microprocessor, microcomputer or programmable digital processor, with associated software, operating system and/or any other associated programs to implement the control program may be employed. The controller and its associated control program may be implemented in hardware, software or a combination thereof, or in a central program implemented in any of a variety of forms according to alternative embodiments. A single control system may regulate the controller for the battery management system and the controller for the vehicle according to an alternative embodiment.

It is important to note that the construction and arrangement of the battery system module as shown in the preferred and other exemplary embodiments is illustrative only. Although only a few embodiments of the present inventions have been described in detail in this disclosure, those skilled in the art who review this disclosure will readily appreciate that many modifications are possible (e.g. variations in sizes, dimensions, structures, shapes and proportions of the various elements, values of parameters, mounting arrangements, use of materials, colors, orientations, etc.) without materially departing from the novel teachings and advantages of the subject matter recited in the claims. For example, the battery system module is compatible and scalable with loads of any voltages according to alternative embodiments. The battery system module may have a size and shape for containing a wide array of different component shapes and sizes according to alternative embodiments. The battery system module may include a number of compartments that may be configured in various orientations (e.g. horizontal, vertical, etc.) and positions (e.g. with respect to the engine or other vehicle systems and components) and/or configured (e.g. shaped and sized) to fit in one or multiple vehicles of different types according to alternative embodiments. Accordingly, all such modifications are intended to be included within the scope of the present inventions as defined in the appended claims. The order or sequence of any process or method steps may be varied or re-sequenced according to alternative embodiments. In the claims, any means-plus-function clause is intended to cover the structures described in this disclosure as performing the recited function and not only structural equivalents but also equivalent structures. Other substitutions, modifications, changes and omissions may be made in the design, operating conditions and arrangement of the preferred and other exemplary embodiments without departing from the spirit of the present inventions as expressed in the appended claims.

What is claimed is:

1. A module for a battery comprising:
 a container having a cover coupled to a base; and
 a power system in the container comprising:
 a high voltage battery for powering a plurality of high voltage loads;
 a low voltage battery for powering a plurality of low voltage loads;

a converter at least partially in the container configured for directing power provided from the high voltage battery to the low voltage battery;

a device for disconnecting at least one of the high voltage battery from the plurality of high voltage loads and the low voltage battery from the plurality of low voltage loads;

wherein the container is configured to transfer heat from the power system to an outside of the container.

2. The module of claim 1 wherein the device comprises a switch.

3. The module of claim 2 wherein the high voltage loads are disconnected from the high voltage battery when the cover is decoupled from the base.

4. The module of claim 3 further comprising a door for accessing a plurality of fuses for the plurality of high voltage loads.

5. The module of claim 4 wherein the device is actuated by opening the door.

6. The module of claim 4 wherein the device comprises an actuator coupled to at least one of the door and the base and further comprises a sensor coupled to at least one of the door and the base.

7. The module of claim 6 wherein the device comprises a magnetic proximity sensor switch.

8. The module of claim 2 wherein the high voltage battery comprises a 36 volt battery and the low voltage battery comprises a 12 volt battery.

9. The module of claim 8 wherein the container further comprises a first interface configured for charging the 12 volt battery and a second interface for charging the 36 volt battery.

10. The module of claim 9 wherein the converter comprises a bi-directional DC to DC converter configured for directing power provided from the high voltage battery to the low voltage battery.

11. The module of claim 10 further comprising an inlet for the intake of air along a first air flow path for the transfer of heat from the power system and a second air flow path for the transfer of heat from the DC to DC converter.

12. A module comprising:

a container;

at least one high voltage battery provided in the container and configured to provide power to at least one high voltage load of a vehicle;

at least one low voltage battery provided in the container and configured to provide power to at least one low voltage load of a vehicle; and a converter for transferring power between the at least one high voltage battery to the at least one low voltage battery;

wherein the container includes at least one aperture for transferring heat from the container.

13. The module of claim 12 wherein the container includes a cover coupled to a base.

14. The module of claim 13 further comprising a switch for disconnecting at least one of the at least one high voltage battery from at least one high voltage load and the at least one low voltage battery from at least one low voltage load.

15. The module of claim 14 wherein the module is configured to disconnect the at least one high voltage load from the at least one high voltage battery when the cover is decoupled from the base.

16. The module of claim 14 further comprising a door provided in the cover and wherein the switch is actuated by opening the door.

17. The module of claim 14 wherein the switch is a magnetic proximity sensor switch.

18. The module of claim 12 wherein the converter includes at least one fin for transferring heat from the converter.

19. The module of claim 12 wherein the at least one high voltage battery has a voltage of 36 volts and the at least one low voltage battery has a voltage of 12 volts.

20. The module of claim 12 further comprising a first interface for charging the at least one low voltage battery and a second interface for charging the at least one high voltage battery.

21. The module of claim 12 wherein the converter comprises a bi-directional DC to DC converter for directing power from the at least one high voltage battery to the at least one low voltage battery.

22. The module of claim 12 further comprising an inlet for providing air flow into the container.

23. The module of claim 22 wherein the container is configured to provide a first air flow path for transferring heat from the at least one low voltage battery and a second air flow path for transferring heat from the at least one high voltage battery.

24. The module of claim 22 wherein the inlet includes a baffle comprising a plurality of walls for providing a tortuous path for the air flow.

25. The module of claim 24 wherein the baffle is configured to inhibit the flow of debris into the container.

26. A module for a battery comprising:

a container;

at least one high voltage battery for providing power to at least one high voltage load in a vehicle;

at least one low voltage battery for providing power to at least one low voltage load in the vehicle;

a converter configured to transfer power between the at least one high voltage battery and the at least one low voltage battery;

an inlet for providing an air flow into the container; and at least one outlet for allowing the air flow to escape the container;

wherein the container is configured to allow for removal of heat from the at least one low voltage battery and the at least one high voltage battery utilizing the air flow.

27. The module of claim 26 wherein the inlet includes a baffle that provides a tortuous path for the air flow.

28. The module of claim 27 wherein the baffle includes at least one vertical wall.

29. The module of claim 27 wherein the inlet is configured to provide the air flow into the container when the vehicle is moving and the baffle is configured to inhibit debris from entering the container.

30. The module of claim 26 wherein the container is configured to provide a first air flow path for removing heat from the at least one low voltage battery and a second air flow path for removing heat from the at least one high voltage battery.

31. The module of claim 26 further comprising an outlet for discharging debris from the inlet.

32. The module of claim 26 wherein the converter includes a plurality of heat exchange fins for removing heat from the converter.

33. The module of claim 32 wherein the container includes a cover and a base and the at least one aperture is provided in the cover.

34. The module of claim 33 wherein the plurality of heat exchange fins extend through the at least one aperture provided in the cover.

35. The module of claim 33 further comprising a device for disconnecting at least one of the at least one high voltage battery and the at least one low voltage battery from a load.

36. The module of claim 35 wherein the device comprises a switch that is actuated when the cover is decoupled from the base.

37. The module of claim 26 wherein the converter is a bi-directional converter.

38. The module of claim 26 wherein the at least one high voltage battery is a 36 volt battery and the at least one low voltage battery is a 12 volt battery.

39. The module of claim 26 further comprising a first switch configured to disconnect the at least one high voltage battery from the at least one high voltage load and a second switch configured to disconnect the at least one low voltage battery from the at least one low voltage load.

40. The module of claim 39 further comprising a control system configured to open the first switch when an engine of the vehicle is off and further configured to close the first switch when the charge of the at least one high voltage battery is greater than a predetermined value.

41. The module of claim 40 wherein the control system is further configured to open the second switch when a charging voltage applied to at least one of the at least one high voltage battery and the at least one low voltage battery is less than a predetermined value.

42. The module of claim 41 further comprising a sensor configured to provide a signal representative of the charging voltage.

43. The module of claim 42 further comprising a display configured to indicate the charging of at least one of the at least one low voltage battery and the at least one high voltage battery.

* * * * *